US008089648B2

(12) United States Patent
Chung et al.

(10) Patent No.: US 8,089,648 B2
(45) Date of Patent: Jan. 3, 2012

(54) IMAGE FORMING APPARATUS TO SET OPTIMAL PRINT OPTIONS FOR TEST PRINTS OF PRIMITIVE IMAGES AND METHOD THEREOF

(75) Inventors: Woo-jun Chung, Suwon-si (KR); Sung-hyun Lim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1411 days.

(21) Appl. No.: 11/092,669

(22) Filed: Mar. 30, 2005

(65) Prior Publication Data

US 2005/0248788 A1 Nov. 10, 2005

(30) Foreign Application Priority Data

May 10, 2004 (KR) ........................ 10-2004-0032763

(51) Int. Cl.
*G06F 3/12* (2006.01)
*G06F 15/00* (2006.01)
*G06K 1/00* (2006.01)

(52) U.S. Cl. .......................... 358/1.15; 358/1.1; 358/1.9

(58) Field of Classification Search ................... 358/1.9, 358/1.11–1.18; 399/74, 151, 171
See application file for complete search history.

(56) References Cited

U.S. PATENT DOCUMENTS

| | | | | |
|---|---|---|---|---|
| 5,495,539 | A * | 2/1996 | Sieverding | 382/276 |
| 5,502,550 | A * | 3/1996 | Hori et al. | 399/74 |
| 6,426,801 | B1 * | 7/2002 | Reed | 358/1.16 |
| 7,397,572 | B1 * | 7/2008 | Horii | 358/1.13 |
| 2001/0048530 | A1 * | 12/2001 | Hayashi et al. | 358/1.13 |

FOREIGN PATENT DOCUMENTS

| | | |
|---|---|---|
| JP | 06-106810 | 4/1994 |
| JP | 06-238982 | 8/1994 |
| JP | 2000-272174 | 10/2000 |
| JP | 2001-136398 | 5/2001 |
| JP | 2001-243038 | 9/2001 |
| JP | 2002-283623 | 10/2002 |
| JP | 2002-283679 | 10/2002 |

* cited by examiner

*Primary Examiner* — Thierry Pham
(74) *Attorney, Agent, or Firm* — Stanzione & Kim, LLP

(57) ABSTRACT

An image forming apparatus capable of setting optimal print options for test prints of a primitive image and a method thereof. The image forming apparatus includes an image data processing part to create a plurality of test images by converting a primitive image according to a plurality of predetermined sets of print options, an image print part to print the plurality of test images created by the image processing part, a key input part to select one of the plurality of the printed test images, and a control part to set the print options of the selected test image using the key input part print options of the primitive image. Accordingly, the user need not separately set print options for more than one test print performed by more than one print job, since the optimal print options of the primitive image are set by comparing and selecting the test images pre-printed according to the different sets of print options.

39 Claims, 6 Drawing Sheets

FIG. 4A

I further foresee communications among dealers, manufacturers and end-users eventual-ly becoming one seamless loop. This will occur because repeat customers will place orders that will flow from their desktops to dealers for fulfillment. In-stock merchandise will then be shipped from a dealer's location and electron-ic purchase orders will be generated for inven-tory replenishment when stock levels hit a pre-defined value. Special order items, which

FIG. 4B

I further foresee communications among dealers, manufacturers and end-users eventual-ly becoming one seamless loop. This will occur because repeat customers will place orders that will flow from their desktops to dealers for fulfillment. In-stock merchandise will then be shipped from a dealer's location and electron-ic purchase orders will be generated for inven-tory replenishment when stock levels hit a pre-defined value. Special order items, which

•••••••••••••

I further foresee communications among dealers, manufacturers and end-users eventua ly becoming one seamless loop. This will occ because repeat customers will place orders that will flow from their desktops to dealers fo fulfillment. In-stock merchandise will then be shipped from a dealer's location and electron ic purchase orders will be generated for inver tory replenishment when stock levels hit a pre defined value. Special order items, which

•••••••••••••

I further foresee communications among dealers, manufacturers and end-users eventual-ly becoming one seamless loop. This will occur because repeat customers will place orders that will flow from their desktops to dealers for fulfillment. In-stock merchandise will then be shipped from a dealer's location and electron-ic purchase orders will be generated for inven-tory replenishment when stock levels hit a pre-defined value. Special order items, which

•••••••••••••

I further foresee communications among dealers, manufacturers and end-users eventual-ly becoming one seamless loop. This will occur because repeat customers will place orders that will flow from their desktops to dealers for fulfillment. In-stock merchandise will then be shipped from a dealer's location and electron-ic purchase orders will be generated for inven-tory replenishment when stock levels hit a pre-defined value. Special order items, which

•••••••••••••

FIG. 4C

I further foresee communications among dealers, manufacturers and end-users eventually becoming one seamless loop. This will occur because repeat customers will place orders that will flow from their desktops to dealers for fulfillment. In-stock merchandise will then be shipped from a dealer's location and electronic purchase orders will be generated for inventory replenishment when stock levels hit a predefined value. Special order items, which

IMAGE FORMING APPARATUS TO SET OPTIMAL PRINT OPTIONS FOR TEST PRINTS OF PRIMITIVE IMAGES AND METHOD THEREOF

CROSS-REFERENCE TO RELATED APPLICATIONS

This application claims the benefit under 35 U.S.C. §119 (a) from Korean Patent Application No. 2004-32763 filed on May 10, 2004 in the Korean Intellectual Property Office, the entire disclosure of which is incorporated herein by reference.

BACKGROUND OF THE INVENTION

1. Field of the Invention

The present general inventive concept relates generally to an image forming apparatus and method of setting image print options. More particularly, the present general inventive concept relates to an image forming apparatus to print a primitive image according to print options set by a user, and a method of setting the print options.

2. Description of the Related Art

An image forming apparatus typically performs data processing with respect to image data that is either self-created or received from an external device. The image forming apparatus transfers the processed image data to the external device or prints the processed image data on paper. The image forming apparatus includes a photocopier, a printer, a scanner, a facsimile machine, and a multifunction machine, which combines various functions of one or more of the abovementioned image forming apparatuses into a single machine.

The image forming apparatus is capable of printing a primitive image darker than normal, lighter than normal, in color, and/or in black and white.

The following describes a conventional printing operation to print a primitive image in which a user adjusts print options of the image forming apparatus. The image forming apparatus in the description may be a photocopier, by way of example.

To print a large number of copies of the primitive image, the user randomly sets copy options of the photocopier and prints a test copy. The user examines the test copy, and if the test copy is not satisfactory, the user resets the copy options of the photocopier and re-prints another test copy.

The user continues to reset the copy options and print test copies until the user obtains a desired copy image of the primitive image. Once the desired copy image is finally obtained after several trials, the user prints the large number of copies of the primitive image according to the current copy options.

The above example of the printing operation is similar to a copy operation of primitive images used in printing pages of a book.

However, setting copy options separately for each test copy causes the user to experience an inconvenience.

In the above example, the user may end up repeating a previous set of copy options to print a test copy that has already been printed, since the user cannot remember all of the previous sets of copy options. Consequently, such useless test copies only waste paper and toner of the photocopier.

SUMMARY OF THE INVENTION

The present general inventive concept provides an image forming apparatus capable of pre-printing test images with different print options at the same time and setting optimal print options for a desired primitive image by comparing and selecting from the test images, and a method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an image forming apparatus comprising an image data processing part to create a plurality of test images by converting a primitive image according to a plurality of predetermined sets of print options, an image print part to print the plurality of test images created by the image data processing part, a key input part to select one of the plurality of the printed test images, and a control part to set the print options of the selected test image using the key input part as print options of the primitive image.

The image data processing part may then convert the primitive image according to the print options set by the control part, and the image print part prints the primitive image converted by the image data processing part.

The print options may include at least one of an image brightness, a background brightness, a color, and a resolution of the primitive image.

The plurality of the test images created by the image data processing part may be individually selectable and unselectable.

A test image having a different set of print options can be added to the plurality of the test images created by the image data processing part.

The image print part may print the plurality of the test images on a single sheet of paper.

A specified number of the plurality of the test images to be printed on the single sheet of paper may be selectable.

The primitive image may be one of a scanned image, an image corresponding to fax data, and an image corresponding to printing data.

The foregoing and/or other aspects and advantages of the present general inventive concept are also achieved by providing a method of setting print options of a primitive image, the method comprising setting a plurality of sets of print options different from each other, creating a plurality of test images by converting the primitive image according to the plurality of sets of print options, printing the plurality of created test images, receiving a selection of one of the plurality of printed test images, and setting the print options of the selected test image as print options of the primitive image.

The method may further comprise the operations of converting the primitive image according to the set print options, and printing the converted primitive image.

The print options may include at least one of an image brightness, a background brightness, a color, and a resolution of the primitive image.

The setting of the plurality of sets of print options may include individually selecting an intended set of print options in a list of the plurality of sets of print options that are different from each other.

The setting of the plurality of sets of print options may include individually selecting an additional set of print options to be added to the list of the plurality of sets of print options.

The printing of the plurality of created test images may include printing the plurality of test images on a single sheet of paper.

A specified number of the plurality of the test images to be printed on the single sheet of paper may be selectable.

The primitive image may include one of a read image, an image corresponding to fax data, and an image corresponding to printing data.

BRIEF DESCRIPTION OF THE DRAWINGS

These and/or other aspects and advantages of the present general inventive concept will become apparent and more readily appreciated from the following description of the embodiments, taken in conjunction with the accompanying drawing of which:

FIG. 4A depicts an example of a scanned primitive image;

FIG. 4B depicts an example of pre-printed test images of the scanned primitive image of FIG. 4A; and FIG. 4C depicts a copy of the scanned primitive image of FIG. 4A according to an optimal print option setup.

DETAILED DESCRIPTION OF THE PREFERRED EMBODIMENTS

Figure 1:
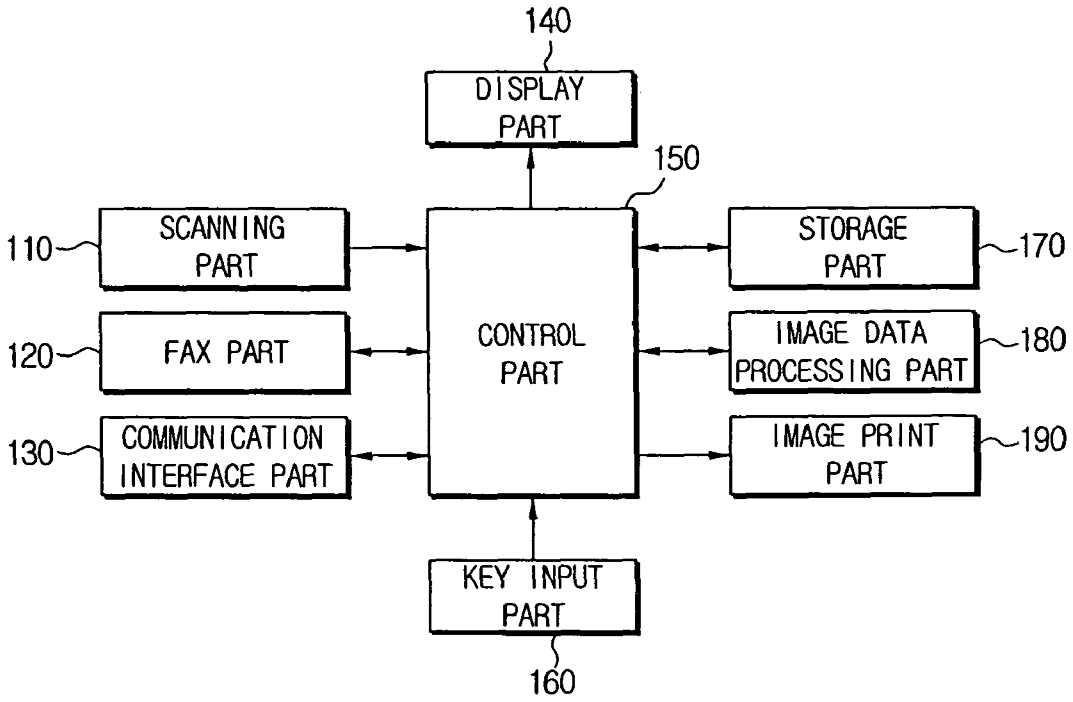
FIG. 1 is a block diagram illustrating an image forming apparatus capable of setting optimal print options for test prints of a primitive image according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the drawings.

FIG. 1 is a block diagram illustrating an image forming apparatus capable of setting optimal print options for test prints of a primitive image. Referring to FIG. 1, the image forming apparatus includes a scanning part 110, a fax part 120, a communication interface part 130, a display part 140, a control part 150, a key input part 160, a storage part 170, an image data processing part 180, and an image print part 190.

The scanning part 110 produces primitive image data by scanning the primitive image to be printed or copied. The fax part 120 receives fax data through a PSTN (public switched telephone network). The communication interface part 130 communicates data with an external device such a personal computer and/or a digital camera, and receives printing data from the external device.

The display part 140 displays an operation state of the image forming apparatus and a user menu. Typically, an LCD (liquid crystal display) may be used to implement the display part 140. The user menu may include a 'test option' setup menu (FIG. 3A), an 'add test image' setup menu (FIG. 3B), and a 'number of pages per sheet' setup menu (FIG. 3C), to be explained below.

The key input part 160 is an interface device, which receives an operation command input by a user and sends the operation command to the control part 150. The key input part 160 is used to set print options including the 'test option,' the 'add test image,' and the 'number of pages per sheet.' The key input part 160 may be used to select and input one of a plurality printed test images after the test images have been printed.

The storage part 170 is a recording medium that stores image data and programs to drive the image forming apparatus. The storage part 170 also stores the primitive image data produced by the scanning part 110, the fax data received by the fax part 120, and the printing data received by the communication interface part 130. The storage part 170 also stores test image print options, a primitive image print option, and the like.

The image data processing part 180 processes and converts the primitive image according to the print options set by the user. Specifically, the image data processing part 180 can adjust an 'image brightness,' a 'background brightness,' a 'color,' and a 'resolution' of the primitive image depending on the set print options. Other print options may also be used with the present general inventive concept. The image data processing part 180 can also process the fax data and the printing data as mentioned above. The programs used by the image data processing part 180 are stored in the storage part 170.

The image print part 190 prints an image that corresponds to the image data stored in the storage part 170 onto paper.

The control part 150 controls an operation of the image forming apparatus. The control part 150 controls the display part 140 to display the user menu and the storage part 170 to store the print options set by the user. The control part 150 controls the data processing of the image data processing part 180 to convert the primitive image according to the set print options. The control part 150 controls the storage part 170 to store the image data processed by the image data processing part 180, and controls the image print part 190 to print the stored image data.

Figure 2:
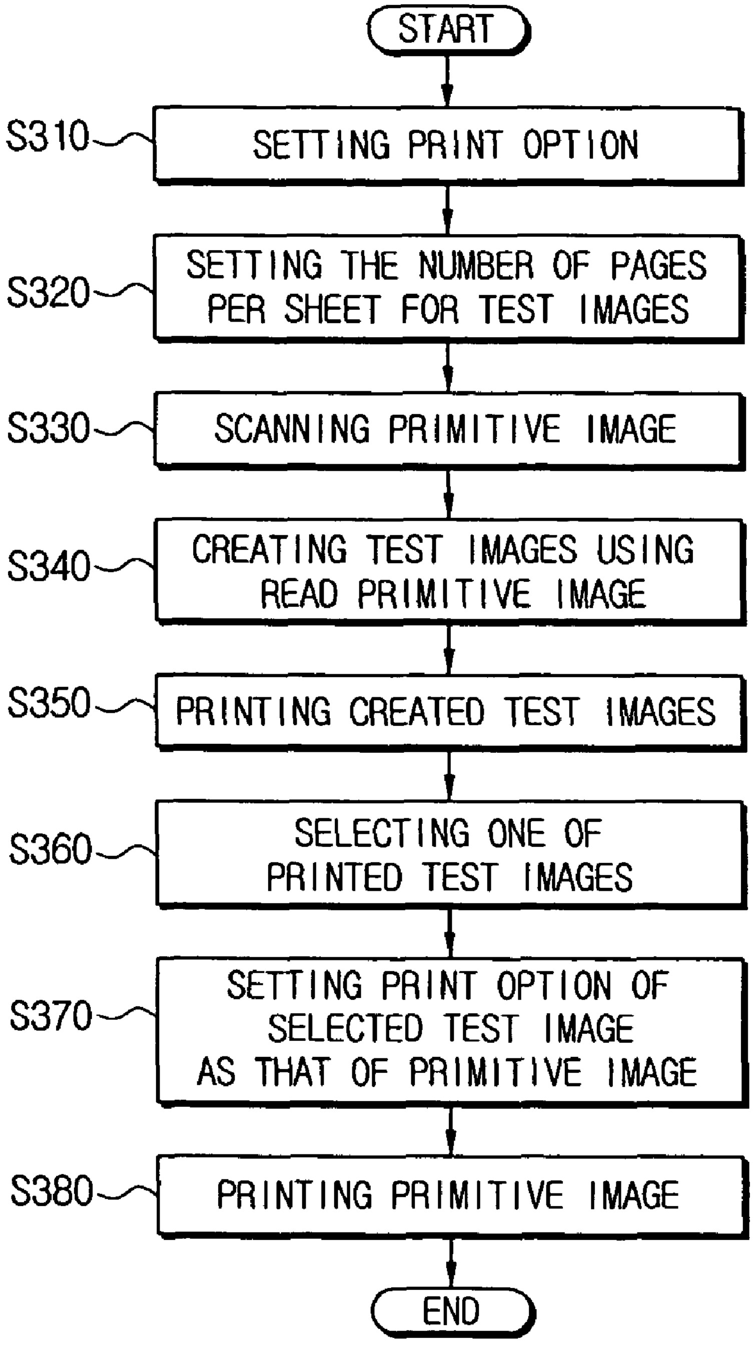
FIG. 2 is a flowchart illustrating a method of setting the optimal print options for the test prints of the primitive image according to another embodiment of the present general inventive concept.

FIG. 2 is a flowchart illustrating a method of setting optimal print options for test prints of a primitive image according to an embodiment of the present general inventive concept. FIG. 2 will now be described with reference to the image forming apparatus of FIG. 1.

Referring to FIG. 2, the user sets the 'test option' (S310). The 'test option' provides selection, unselection, and addition of test images to be pre-printed. The test images are printed with different sets of print options. The 'test option' can be set by the user from the user menu.

Figure 3A:
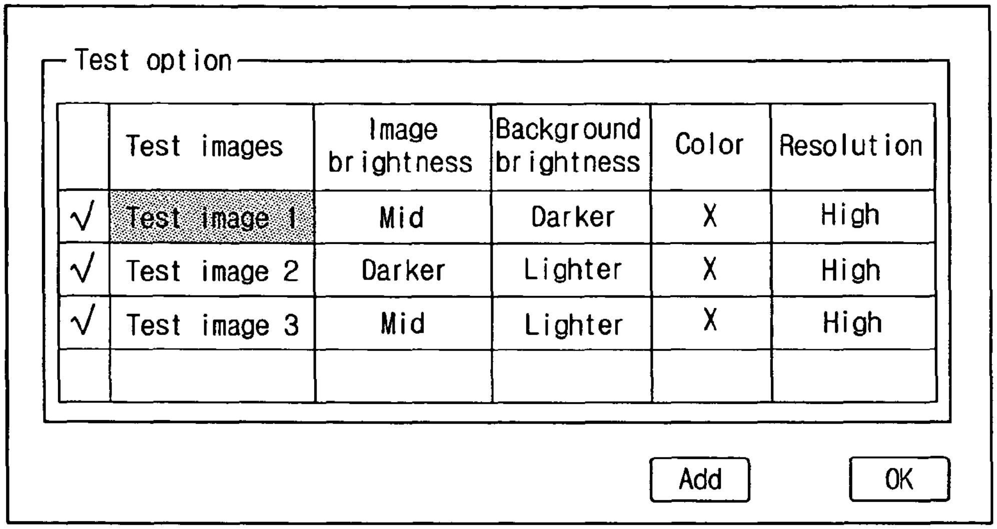
FIG. 3A illustrates a menu displayed for a 'test option' setup.

FIG. 3A illustrates a user setup menu for the 'test option'. In FIG. 3A, the user setup menu for the 'test option' displays a list of test images including 'test image 1,' 'test image 2,' and 'test image 3' having different sets of print options including an 'image brightness,' a 'background brightness,' a 'color,' and a 'resolution.'

The user setup menu for the 'test option' includes check marks "✓" on the left of the list of test images. The check marks "✓" indicate test images to be pre-printed. The user can move a cursor up and down over the list of test images using direction keys (not shown) provided by the key input part 160. The user may select or unselect a test image using a select key (not shown). Since the check marks "✓" appear depending on user selection and/or unselection, the user can perceive the selection or unselection of the test images in the user setup menu for the 'test option.'

Figure 3B:
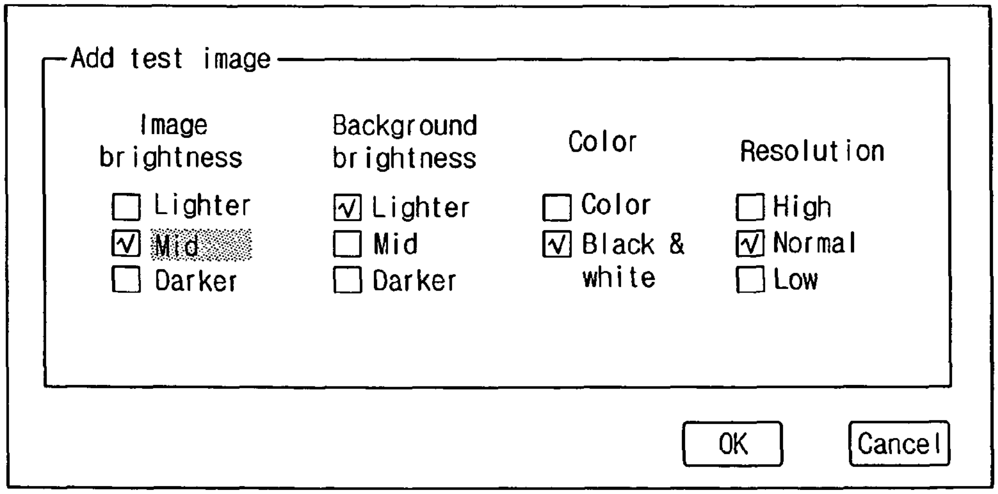
FIG. 3B illustrates a menu displayed for an 'add test image' setup option.

The user can add a new test image with a different set of print options to the list of test images by selecting an 'ADD' icon at the bottom of the user setup menu for the 'test option'. FIG. 3B illustrates an 'add test image' menu displayed upon selection of the 'ADD' icon of FIG. 3A.

The user sets the print options of the added test image using the 'add test image' menu of FIG. 3B. Upon selecting an 'OK' icon after setting the print options, a 'test image 4' is added to the list of test images in the setup menu for the 'test option' of FIG. 3A, together with information relating to the set of print options of the added test image of FIG. 3B.

Referring back to FIG. 2, the user then sets the 'number of pages per sheet' of the test images using the user menu (S320).

Figure 3C:
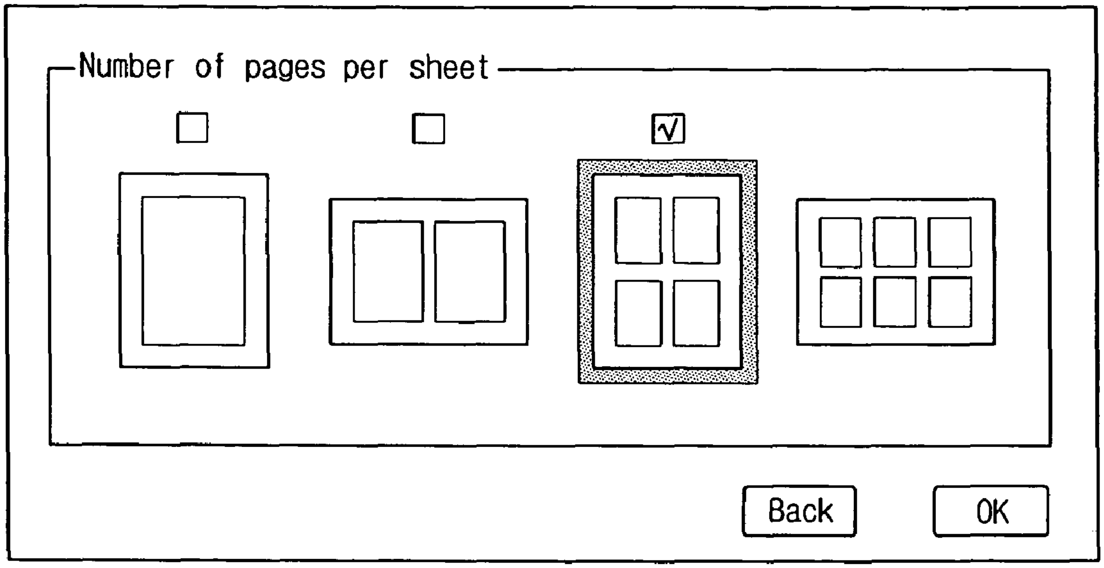
FIG. 3C illustrates a menu displayed for a 'number of pages per sheet' setup option.

The user menu to set the 'number of pages per sheet' option is illustrated in FIG. 3C. The user menu of FIG. 3C enables the user to set between one and six pages per sheet. Other numbers of pages per sheet may also be used according to the present general inventive concept. The number of pages per sheet determines the number of sheets on which the test images are to be printed.

Once the user has finished setting the print options for the test images, the scanning part 110 produces primitive image data by scanning the primitive image to be copied as depicted in FIG. 4A (S330).

The image data processing part 180 creates the test images using the scanned primitive image (S340). The image data processing part 180 creates the test images according to the print options set at operation S310. In particular, the image processing part 180 creates the test images by converting the scanned primitive image according to the print options of each of the test images selected and/or added at operation S310.

The image print part 190 then prints the created test images (S350). A print job is performed according to the 'number of pages per sheet' option set for the test images at operation S320. By way of example, FIG. 4B depicts that four test images are printed on one print sheet when the 'number of pages per sheet' option of the test images is set to '4'. The respective printed test images correspond to the test images selected and/or added at operation S310. Test image names including 'test image 1' to 'test image 4' may be printed below the respective test images.

The user then selects one of the printed test images (S360). The user compares the test images printed according to the different sets of print options, and selects an optimal test image from among the printed test images. The user inputs the name of the selected test image using the key input part 160 to select an optimal set if print options.

The control part 150 sets the print options of the test image selected by the user as that of the primitive image (S370). For instance, if the user selects the 'test image 2' of FIG. 3A, the set of print options of the 'test image 2' are set as the print options of the primitive image.

The scanned primitive image is then printed according to the print options set at operation S370 (S380). FIG. 4C depicts a copy of the primitive image when the set of print options of the 'test image 2' are set as the print options of the primitive image. Consequently, the print options of the copy depicted in FIG. 4C are identical the print options of the 'test image 2' as selected by the user.

If the user does not change the print options of the primitive image, the scanned primitive image is printed according to the print options set at operation S370.

In the present embodiment of the present general inventive concept, the optimal print options are set for the primitive image by pre-printing the test images with respect to the primitive image obtained by the scanning part 110 and using the pre-printed test images. It is to be understood that the optimal print options can be set by pre-printing the test images using the fax data received by the fax part 120 and/or the printing data received by the communication interface part 130.

In light of the foregoing, the optimal print options for the primitive image can be selected and set by comparing the test images pre-printed according to different sets of print options. In effect, the user does not have to set the print options for every print job of each of the test images. Furthermore, since multiple test images are printable on one print sheet, it is easy to compare the test images and toner consumption may be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:

a display part to display a user setup menu including a list of a plurality of test images selected by a user representing a primitive image according to different sets of print options selected by the user;

a key input part to select or unselect test images to be printed from the displayed list of test images;

an image data processing part to create a plurality of test images selected from the list by converting the primitive image according to predetermined sets of print options corresponding to the selected test images;

an image print part to print the selected test images created by the image data processing part by performing a print job; and a control part to set print options of the image forming apparatus, wherein, when a name or identifier of one test image among the printed selected test images is input through the key part, the control part sets print options applied to the one test image as print options of the image forming apparatus.

2. The image forming apparatus according to claim 1, wherein the user setup menu displays the list of plurality of test images and print options applied to each of the plurality of test images, and a new test image can be added to the list.

3. The image forming apparatus according to claim 1, wherein the print options include at least one of an image brightness, a background brightness, a color, and a resolution of the primitive image.

4. The image forming apparatus according to claim 1, wherein the plurality of the test images created by the image data processing part are individually selectable and unselectable.

5. The image forming apparatus according to claim 4, wherein the plurality of predetermined sets of print options comprise a first set of print options, and a second set of print options, and the plurality of the test images created by the image data processing part comprise a first test image and a second test image converted from the primitive image according to the first and second sets of print options, respectively.

6. The image forming apparatus according to claim 1, wherein the image print part prints the plurality of the test images on a single sheet of paper.

7. The image forming apparatus according to claim 6, wherein a specified number of the plurality of the test images to be printed on the single sheet of paper is selectable.

8. The image forming apparatus according to claim 1, wherein the primitive image is one of a scanned image, an image corresponding to fax data, and an image corresponding to printing data.

9. The image forming apparatus according to claim 1, wherein the key input part receives key inputs from the user, and the display part works in communication with the key input part to display at least one of:

a test option setup menu to enable the user to compile a list of the plurality of test images, an add test image setup menu to enable the user to add a new test image to the list of the plurality of test images, and a number of pages per sheet menu to enable the user to specify a number of the plurality of test images to be printed on a sheet of paper.

10. The image forming apparatus according to claim 9, wherein the key input part communicates with the control part to enable the user to select the selected test image from the plurality of printed test images.

11. An image forming apparatus, comprising:

a user menu interface to enable a user to set up, adjust and select from a list of a plurality of test images of a predetermined image to be printed, and each of the test images to be printed having corresponding sets of print options that have been selected by the user;

a print part to perform a first print job to print the plurality of test images selected from the list and to enable the user to examine test prints of the plurality of test images;

an input part to receive a selection of one of the printed plurality of test images; and a control part to set print options for the predetermined image to be the set of print options that corresponds to the selected test image among the printed plurality of test images and to control the print part to perform a second print job to print the predetermined image according to the set of print options of the selected test image.

12. The image forming apparatus according to claim 11, wherein data corresponding to the predetermined image is received from one of a scanning part, a fax part, and a communication interface part.

13. The image forming apparatus according to claim 11, wherein the user menu interface comprises at least two of:

a test option set up menu to enable the user to compile a list of the plurality of test images to be printed;

an add test image menu to enable the user to add a new test image to the list of the plurality of images to be printed; and a number of test images per sheet menu to enable the user to select the number of test images to be printed on a sheet of paper.

14. The image forming apparatus according to claim 13, wherein the test option set up menu comprises a portion that displays each of the plurality of test images and corresponding sets of print options and enables the user to individually select and deselect each of the plurality of test images.

15. The image forming apparatus according to claim 11, wherein the each of the corresponding sets of print options are different with respect to each other.

16. An image forming apparatus, comprising:

a display part to display a list of test images selected by a user including a first test image and a second test image representing a primitive image to be selected or unselected in a user setup menu having different sets of print options selected by the user;

an image data processing part to create the first test image and the second test image of the primitive image selected by the user from the list according to a first print option and a second print option, respectively;

an input part to select or unselect one of the first test image and the second test image from the displayed list of test images; and a control part to generate an image signal including the first test image and the second test image modified according to the first print option and the second print option, respectively, wherein the control part controls the image data processing part to form the image signal to be printed on a single sheet of paper.

17. The image forming apparatus according to claim 16, further comprising:

a print part to print the image signal on the single sheet of paper.

18. The image forming apparatus according to claim 16, wherein the input part generates a menu to select the first and second print options.

19. The image forming apparatus according to claim 16, wherein the first test image is the primitive image and the second test image is modified from the first test image according to the second print option.

20. The image forming apparatus according to claim 16, wherein the display part displays the first test image and the second test image in a single screen.

21. The image forming apparatus according to claim 16, wherein the control part sets the second print option as the first print option of the first test image.

22. A method of setting print options of a primitive image in an image forming apparatus, the method comprising:

displaying a list of test images selected by a user representing the primitive image on a user interface to correspond to a plurality of sets of print options selected by the user;

setting the plurality of sets of print options different from each other;

selecting or unselecting test images to be printed from the list of test images;

creating the plurality of selected test images from the list by the user by converting the primitive image according to the plurality of sets of print options;

performing a print job to print the plurality of created test images;

receiving a selection of one of the plurality of printed test images; and setting the print options of the selected test image among the plurality of printed test images as print options of the primitive image.

23. The method according to claim 22, further comprising:

converting the primitive image according to the set print options; and printing the converted primitive image.

24. The method according to claim 22, wherein the print options include at least one of an image brightness, a background brightness, a color, and a resolution of the primitive image.

25. The method according to claim 22, wherein the setting of the plurality of sets of print options comprises individually selecting an intended set of print options in a list of the plurality of sets of print options that are different from each other.

26. The method according to claim 25, wherein the setting of the plurality of sets of printing options comprises adding an additional set of print options to the list of the plurality of sets of print options.

27. The method according to claim 22, wherein the printing of the plurality of the created test images comprises printing the plurality of test images on a single sheet of paper.

28. The method according to claim 27, wherein a specified number of the plurality of test images to be printed on the single sheet of paper is selectable.

29. The method according to claim 22, wherein the primitive image is one of a read image, an image corresponding to fax data, and an image corresponding to printing data.

30. The method according to claim 22, wherein setting the plurality of sets of print options that are different from each other comprises:

displaying a set up menu including one or more of:

displaying a test option setup menu to enable the user to compile a list of the plurality of test images, displaying an add test image setup menu to enable the user to add a new test image to the list of the plurality of test images, and displaying a number of pages per sheet menu to enable the user to specify a number of the plurality of test images to be printed on a sheet of paper, and receiving one or more key inputs to from the user to control the set up menu.

31. The method according to claim 30, wherein the one or more received key inputs selects the selected test image from the plurality of printed test images.

32. A method of an image forming apparatus, the method comprising:

enabling a user to set up, select, unselect, adjust and display a list of a plurality of test images of a predetermined image to be printed using a user interface, and each of the plurality of test images to be printed having corresponding sets of print options that have been selected by the user;

performing a first print job to print the plurality of test images selected from the list by the user and to enable the user to examine test prints of the plurality of test images;

receiving a selection of one of the plurality of printed test images;

setting print options for the predetermined image to the set of print options corresponding to the selected test image among the plurality of printed test images; and performing a second print job to print the predetermined image according to the set of print options thereof.

33. The method according to claim 32, wherein data corresponding to the predetermined image is received from one of a scanning part, a fax part, and a communication interface part.

34. The image forming apparatus according to claim 32, wherein the user interface comprises at least two of:

a test option set up menu to enable the user to compile a list of the plurality of test images to be printed, an add test image menu to enable the user to add a new test image to the list of the plurality of images to be printed, and a number of test images per sheet menu to enable the user to select the number of test images to be printed on a sheet of paper.

35. The method according to claim 34, wherein the test option set up menu includes a portion that displays each of the plurality of test images and corresponding sets of print options and enables the user to individually select and deselect each of the plurality of test images.

36. A method of performing test prints of a predetermined image in an image forming apparatus, the method comprising:

creating and displaying on a user setup menu a plurality of sets of print options to be selected by a user to display a list of a plurality of test images selected by the user of the predetermined image to be selected or unselected;

performing a pre-print job to print the plurality of test images selected by the user representing the different user selected print options of the predetermined image;

selecting one of the plurality of pre-printed test images having desired print characteristics; and performing a print job to print the predetermined image according to the corresponding set of print options of the selected pre-printed test image.

37. The method according to claim 36, wherein the plurality of test images correspond to the predetermined image having different sets of print options.

38. A method of printing test images in an image forming apparatus, comprising:

scanning a primitive image to produce primitive image data;

allowing a user to set print options of test images using a test image menu;

displaying a list of the test images selected by the user in a user setup menu on a display part having different sets of print options;

selecting a plurality of the test images to be printed from the displayed list of test images;

processing and converting the scanned primitive image according to the sets of print options to create a plurality of test images of the primitive image with different print options on a printing medium;

printing the plurality of test images;

selecting an optimal test image from the printed test images and inputting a name or identifier of the optimal test image into a user input;

setting print options of the selected optimal test image as the print options of the primitive image; and printing the primitive image with the selected print options, wherein the print options include at least one of an image brightness, a background brightness, a color, and a resolution of the primitive image.

39. An image forming apparatus to print test images, comprising:

a scanning part to scan a primitive image;

a display part to display a list of test images in a user setup menu on the display part having different sets of print options selected by a user;

a user input part including a test image menu to allow the user to set print options of test images and select a plurality of the test images to be printed from the displayed list of test images and a sub-menu to set the print options of the test images;

an image processing part to process and convert the scanned primitive image according to the sets of print options to create a plurality of test images of the primitive image with different print options;

an image print part to print the plurality of test images;

wherein the user input part is used to select an optimal test image from the printed test images and a name of the optimal test image is input to the user input part, wherein print options of the selected optimal test image are set to be the print options of the primitive image, and wherein the image printing part prints the primitive image with the selected print options, wherein the print options include at least one of an image brightness, a background brightness, a color, and a resolution of the primitive image.

* * * * *